US011241841B1

(12) United States Patent
Susnjara et al.

(10) Patent No.: US 11,241,841 B1
(45) Date of Patent: Feb. 8, 2022

(54) SYSTEMS AND METHODS FOR GREATER INTER-LAYER BOND INTEGRITY IN ADDITIVE MANUFACTURING

(71) Applicant: Thermwood Corporation, Dale, IN (US)

(72) Inventors: Kenneth J. Susnjara, Birdseye, IN (US); Brian S. Smiddy, Newburgh, IN (US); Jonathan I. Fuquay, Boonville, IN (US); Joshua A. Lough, Chrisney, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 17/200,120

(22) Filed: Mar. 12, 2021

(51) Int. Cl.
*B29C 64/393* (2017.01)
*B29C 64/118* (2017.01)
*B33Y 50/02* (2015.01)
*B33Y 30/00* (2015.01)
*B33Y 10/00* (2015.01)
B29C 64/386 (2017.01)

(52) U.S. Cl.
CPC .......... *B29C 64/393* (2017.08); *B29C 64/118* (2017.08); *B33Y 10/00* (2014.12); *B33Y 30/00* (2014.12); *B33Y 50/02* (2014.12); *B29C 64/386* (2017.08)

(58) Field of Classification Search
CPC ........ B29C 64/188–194; B29C 64/118; B29C 64/386–393
See application file for complete search history.

(56) References Cited

U.S. PATENT DOCUMENTS

| 7,731,816 | B2 | 6/2010 | Oldani et al. |
| 7,810,539 | B2 | 10/2010 | Mischler et al. |
| 8,151,854 | B2 | 4/2012 | Oldani |
| 8,534,338 | B2 | 9/2013 | Oldani et al. |
| 8,954,180 | B2 | 2/2015 | Oldani |
| 2007/0044899 | A1 | 3/2007 | Tingley |
| 2008/0006017 | A1 | 1/2008 | Rindels |
| 2010/0200168 | A1 | 8/2010 | Oldani et al. |
| 2018/0050502 | A1 | 2/2018 | Oldani |
| 2019/0077081 | A1* | 3/2019 | Susnjara ............... B29C 64/209 |
| 2020/0023575 | A1* | 1/2020 | MacCagnan .......... B29C 64/209 |
| 2020/0238610 | A1* | 7/2020 | Wilson .................. B29C 64/245 |
| 2020/0298496 | A1* | 9/2020 | Puigardeu Aramendia ................ B33Y 10/00 |

OTHER PUBLICATIONS

Sloan, "Big additive machines tackle large molds," CompositesWorld, Jun. 11, 2019, (8 pages).

* cited by examiner

*Primary Examiner* — Matthew J Daniels
*Assistant Examiner* — Andrew L Swanson
(74) *Attorney, Agent, or Firm* — Bookoff McAndrews, PLLC

(57) ABSTRACT

An additive manufacturing apparatus includes an extruder configured to receive a thermoplastic material and an applicator assembly downstream of the extruder, the applicator assembly including a nozzle for depositing the thermoplastic material as a plurality of layers. The additive manufacturing apparatus also includes a temperature sensor configured to detect a temperature of at least a portion of a deposited layer and a positioning assembly configured to change an angular position of the temperature sensor.

18 Claims, 6 Drawing Sheets

SYSTEMS AND METHODS FOR GREATER INTER-LAYER BOND INTEGRITY IN ADDITIVE MANUFACTURING

TECHNICAL FIELD

Aspects of the present disclosure relate generally to apparatus and methods for fabricating components. In some instances, aspects of the present disclosure relate to apparatus and methods for fabricating components (such as, e.g., patterns, molds, and similar products, etc.) via using additive manufacturing techniques or apparatus.

BACKGROUND

Additive manufacturing techniques and processes generally involve the buildup of one or more materials to make a net or near net shape (NNS) object, in contrast to subtractive manufacturing methods. Although "additive manufacturing" is an industry standard term (ASTM F2792), additive manufacturing encompasses various manufacturing and prototyping techniques known under a variety of names, including freeform fabrication, 3D printing, rapid prototyping/tooling, etc. Recent additive manufacturing 3D printers include large-scale 3D printers that are capable of fabricating very large parts, molds, patterns, etc. These items can be produced from fiber-reinforced thermoplastic materials. For example, a method of producing these items utilizes a polymer extruder which generates a bead of molten thermoplastic material which is added to the part being produced one layer at a time. These layers may be modified and/or flattened into wider beads during this process using devices such as tamping plates, rollers, or the like. In order to effectively use this approach, the previous layer should be have cooled and hardened by an amount sufficient to support a new layer and to tolerate the forces generated by the compression roller, tamper, etc., while retaining sufficient heat to re-melt and completely fuse with the new layer being printed. In some processes, including processes referred to as 3D printing or additive manufacturing, the part can be made slightly larger than required and is machined to the final size and shape after the part cools and hardens.

Thermoplastic materials used for 3D printing processes, including processes involving large-scale printers, soften when heated above their melting point and harden again when cooled. 3D printing these materials can require that the layers fuse together to create a solid, void free structure. The quality of the resulting structure is generally determined by the integrity of the bond between the printed layers. If the layers fuse together completely, the resulting structure will exhibit the same physical strength and mechanical properties as the underlying polymer being printed. If, however, bonding between layers is incomplete, the strength of the layer to layer bond can determine the ultimate physical strength of the printed structure. Thus, when layer to layer bonding is relatively weak, the resulting part will itself have a relatively low physical strength.

At least some applications of large scale additive manufactured components, such as industrial assembly fixtures or foundry patterns, do not require perfect layer to layer bonding as imperfectly bonded parts with less than ideal layer to layer bonds exhibit sufficient strength for their intended application. There are numerous components, however, that could potentially be produced using additive manufacturing, such as aircraft components, where perfect or nearly perfect bonding between layers is desired, or even required.

In general, each polymer has a range of temperatures for the previously printed layer that will result in an acceptable layer-to-layer bond with a newly printed layer. When a layer is printed, it begins to cool. The rate of cooling depends on several factors including, the polymer itself, the temperature of the polymer when printed, the temperature of the environment the part is being printed in, and the physical shape to the component being printed. After a period of time that can change based on these factors, the printed layer will have cooled to a temperature within the ideal range for printing the next layer. In many cases, the amount of time a layer takes to cool to the required temperature range tends to be constant for a particular polymer. Some systems can adjust print speed when the geometry of the part changes, so that each layer is printed in the same amount of time. This can be applied when it is desirable for each layer to cool for a similar amount of time regardless of the shape or size of the part being printed. Variations in the geometry of the part can affect the rate of cooling, however, and can cause variations in the temperature of a layer when cooled for a specific amount of time. Since there is a range of temperatures at which acceptable bonding occurs, generally these effects will not result in a layer temperature that is outside the temperature range being used.

In some devices, this range of temperature can be monitored using a thermographic camera. This allows the operator to visually monitor the overall temperature of the part as it is being printed. In at least some of these devices, the display of the thermographic camera is adjusted so that when a surface is within the temperature range desired, it is displayed in a distinct color, which makes analyzing and maintaining the proper temperature easier.

While there is a temperature range at which generally acceptable layer-to-layer bonding occurs, a significant factor for achieving ideal layer-to-layer bonds is the temperature of the previously printed layer at the precise point in time that a new layer is added. For each polymer there is an ideal temperature, or relatively narrow temperature range, at which the best possible layer-to-layer bond occurs. While the approach described above is acceptable for some applications, it may not suitable for others due to the inability to consistently print and deposit layers when the underlying layer is at an ideal temperature.

SUMMARY

Aspects of the present disclosure relate to, among other things, methods and apparatus for fabricating components via layering techniques. Each of the aspects disclosed herein may include one or more of the features described in connection with any of the other disclosed aspects. In particular, an exemplary aspect of this disclosure includes tools useful to facilitate control over print temperature during the print process, such as measuring a temperature of a previously deposited bead of material, and adjusting the speed at which material is deposited based on the measured temperature.

Aspects described herein may be directed to a rotary mechanism and software systems to control a drive mechanism, such as a servomotor, to rotate a compression roller around a print nozzle of an additive manufacturing apparatus. This mechanism may rotate the compression roller so that the roller is maintained at a position behind, and perpendicular to, the direction of motion of the print nozzle at each point in time during the printing process.

At least some configurations described herein include a temperature sensor mounted to the mechanism for rotating the compression roller. This temperature sensor may be mounted or otherwise secured to a position in front of the print nozzle and above the previously printed print bead. A temperature sensor, at this position, may be configured to read or detect the temperature of the previously printed layer at a point in time immediately before the next layer is deposited. This mechanism and associated control components may reduce cost and complexity in at least some configurations.

The temperature sensor may be directed towards a previously deposited bead to measure the temperature of this bead, at a point in time immediately before a print function occurs to deposit a new bead of material on the previously deposited bead. When printing some parts, when a sharp corner is encountered, the temperature sensor may be directed to face or otherwise detect the temperature of free air immediately adjacent to the print nozzle before the print nozzle reaches the corner. Once the nozzle begins moving in the new direction, the rotary mechanism, which may position the compression roller and temperature sensor, may be quickly realigned with the new direction of the bead, allowing the temperature sensor to once again detect the temperature of a previously deposited bead. Since the temperature differential of free air versus the previously printed bead can be relatively large, it may be possible for appropriate software to ignore or discard temperature readings that are not aligned with the previously printed bead.

The systems and methods described herein may provide the ability to read the temperature of the previously printed bead, just before the new bead is printed on top of this bead, with relatively high accuracy. The temperature sensor may also provide a continuous data stream (e.g., real-time or near real-time temperature data) or other information that is indicative of the temperature of an entire area of each printed layer. This data stream, or a portion of the information included in the data stream, may be used in one or more methods to improve the quality of the print process. For example, an average temperature of each layer (e.g., an average or mean temperature for an entirety of a layer) may be accurately determined and used to adjust timing of the print layer in an automatic manner. This timing adjustment may include, for example, increasing or decreasing a speed of translation of a nozzle or other mechanism for depositing material. This may result in deposition of material on a previously deposited layer, while the previously deposited layer has a temperature that is at or near a predetermined desired temperature or at or near a desired predetermined desired temperature range.

In one aspect, an additive manufacturing apparatus may include an extruder configured to receive a thermoplastic material and an applicator assembly downstream of the extruder, the applicator assembly including a nozzle for depositing the thermoplastic material as a plurality of layers. The additive manufacturing apparatus may also include a temperature sensor configured to detect a temperature of at least a portion of a deposited layer and a positioning assembly configured to change an angular position of the temperature sensor.

In another aspect, an additive manufacturing system may include an additive manufacturing apparatus. The additive manufacturing apparatus may include an extruder configured to receive material, an applicator assembly downstream of the extruder, and a temperature sensor configured to generate a temperature signal indicative of a temperature of at least a portion of a first layer deposited while moving the applicator assembly. The additive manufacturing system may include a controller configured to receive the temperature signal from the temperature sensor and change a movement speed of the applicator assembly based on the temperature signal.

In yet another aspect, an additive manufacturing method may include heating thermoplastic material with an extruder, supplying the heated thermoplastic material to an applicator assembly, and depositing the heated material on a surface below the applicator assembly to form a first layer. The method may also include detecting a temperature of at least a portion of the first layer with a temperature sensor, while moving the temperature sensor and depositing the heated material on the first layer to form a second layer.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating multiple components via layering techniques. Specifically, the methods and apparatus described herein may comprise tools that can be used to help achieve a desired or ideal print temperature during an additive manufacturing process, such as printing.

Figure 1:
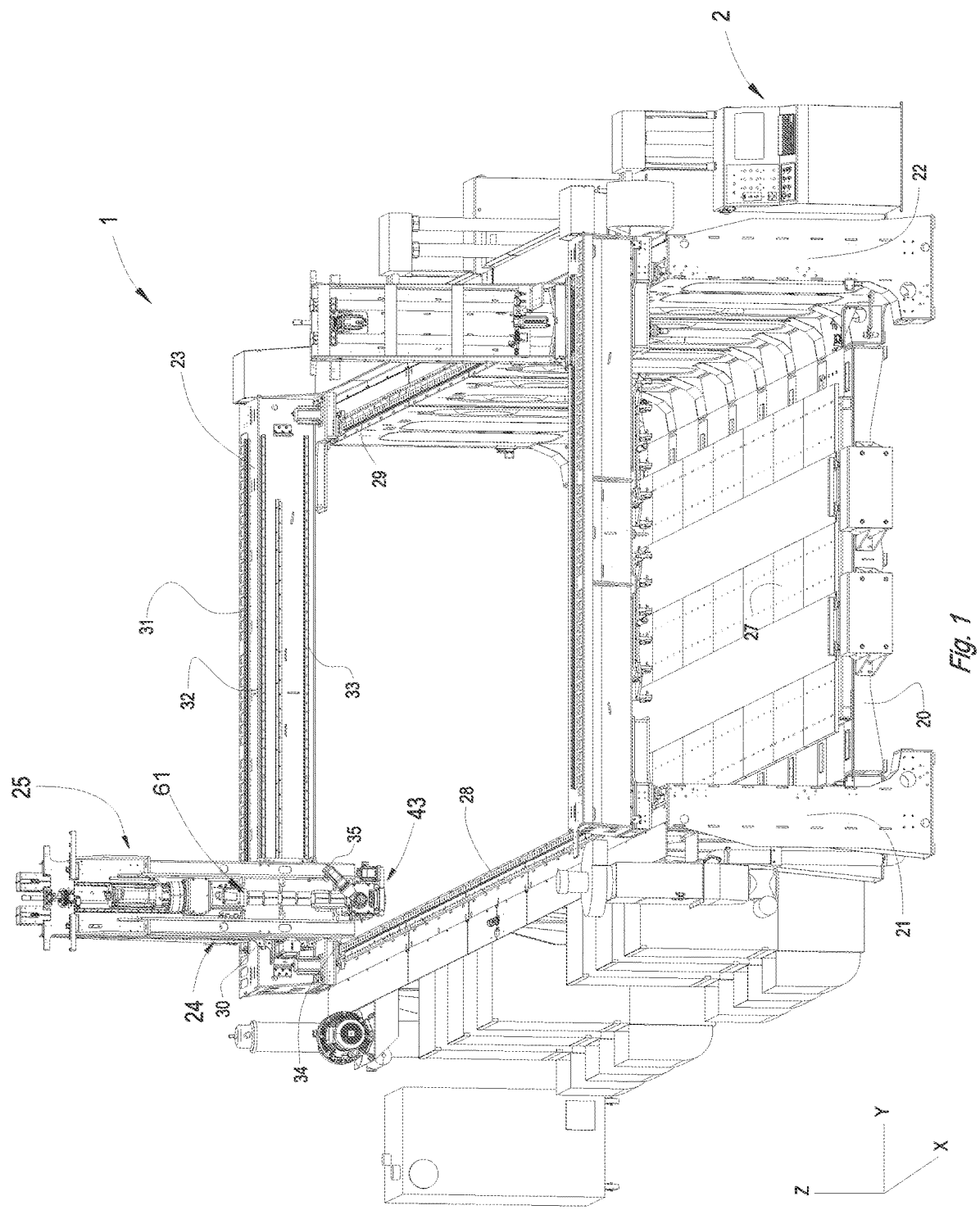
FIG. 1 is a perspective view of an exemplary additive manufacturing apparatus (e.g., CNC machine) operable according to an additive manufacturing process in forming articles, according to an aspect of the present disclosure.

With reference to FIG. 1, additive manufacturing apparatus 1 (e.g., a CNC machine) may be part of an additive manufacturing system including a control system or controller 2 which may be configured to generate commands for controlling CNC machine 1 to perform each of the functions described herein. Additive manufacturing apparatus 1 may include a bed 20 secured between a pair of transversely spaced side walls 21 and 22. Apparatus 1 may also include a printing gantry 23 supported on side walls 21 and 22, a carriage 24 mounted on printing gantry 23, a carrier 25 mounted on carriage 24, an extruder 61, and an applicator assembly or applicator head 43 mounted on carrier 25. A horizontal worktable 27, which may include a support surface, is disposed so as to extend in an x-y plane and is supported on bed 20 between side walls 21 and 22. Printing gantry 23 may be disposed along a y-axis, supported at a pair of opposing ends thereof by side walls 21 and 22. Printing gantry 23 may be secured to a pair of guide rails 28 and 29 provided on the upper ends of side walls 21 and 22. The printing gantry 23 may be displaceable along an x-axis and rails 28 and 29 by a pair of servomotors mounted on the printing gantry 23 and operatively connected to tracks provided on the side walls 21 and 22 secured to bed 20.

Carriage 24 may be supported on printing gantry 23 and provided with a support member 30 mounted on and displaceable with respect to one or more guide rails (e.g., guide rails 31, 32, and 33) secured to printing gantry 23. Carriage 24 may be displaceable along a y-axis by sliding on one or more guide rails (e.g., guide rails 31, 32, and 33). This sliding motion may be caused by actuation of a servomotor mounted on the printing gantry 23 and operatively connected to support member 30. Carrier 25 may be mounted on a set of spaced apart, vertically-extending disposed guide rails 34 and 35. Guide rails 34 and 35 may be supported on carriage 24 for displacement of carrier 25 relative to the carriage 24 and components connected to carrier 25, along a z-axis. Carrier 25 may be displaceable along the z-axis by a servomotor mounted on the carriage 24 and operatively connected to carrier 25.

Figure 2:
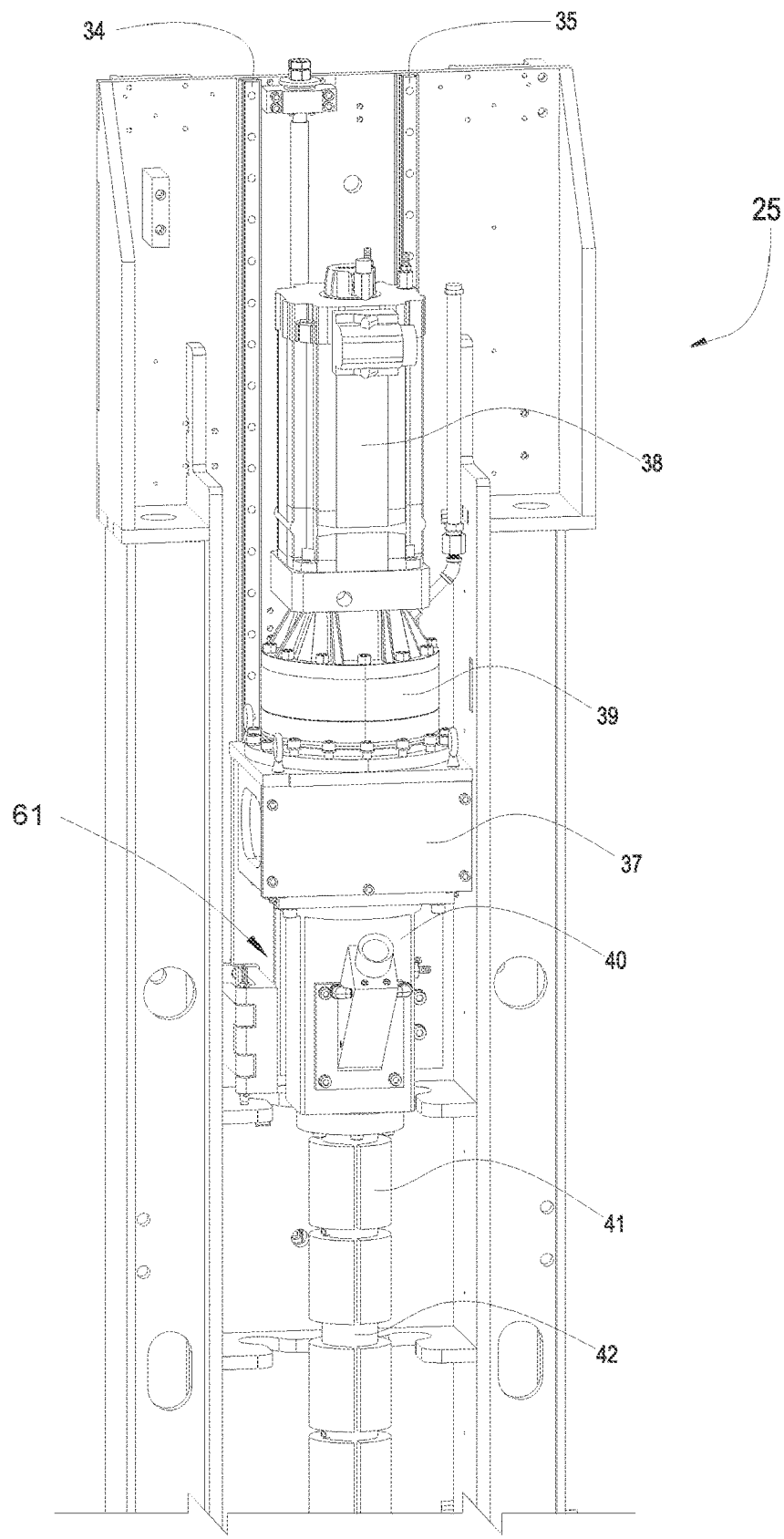
FIG. 2 is a perspective view of an exemplary carrier and extruder assembly shown in FIG. 1.

As shown in FIG. 2, an extruder 61 may be mounted to carrier 25 on a set of rails 34 and 35 and bearings so as to be linearly moveable with respect to carrier 25. A servomotor 38 may drive extruder 61 through a gearbox 39 attached to a transition housing 37. Extruder 61 may receive thermoplastic pellets at a feed housing 40. This material may be supplied to an extruder screw of extruder 61 which transfers the material through barrel 42 where it is melted by the friction of the screw and by heaters 41. Extruder 61 may cause the molten thermoplastic material to flow to a positive displacement melt or gear pump 62.

Figure 3:
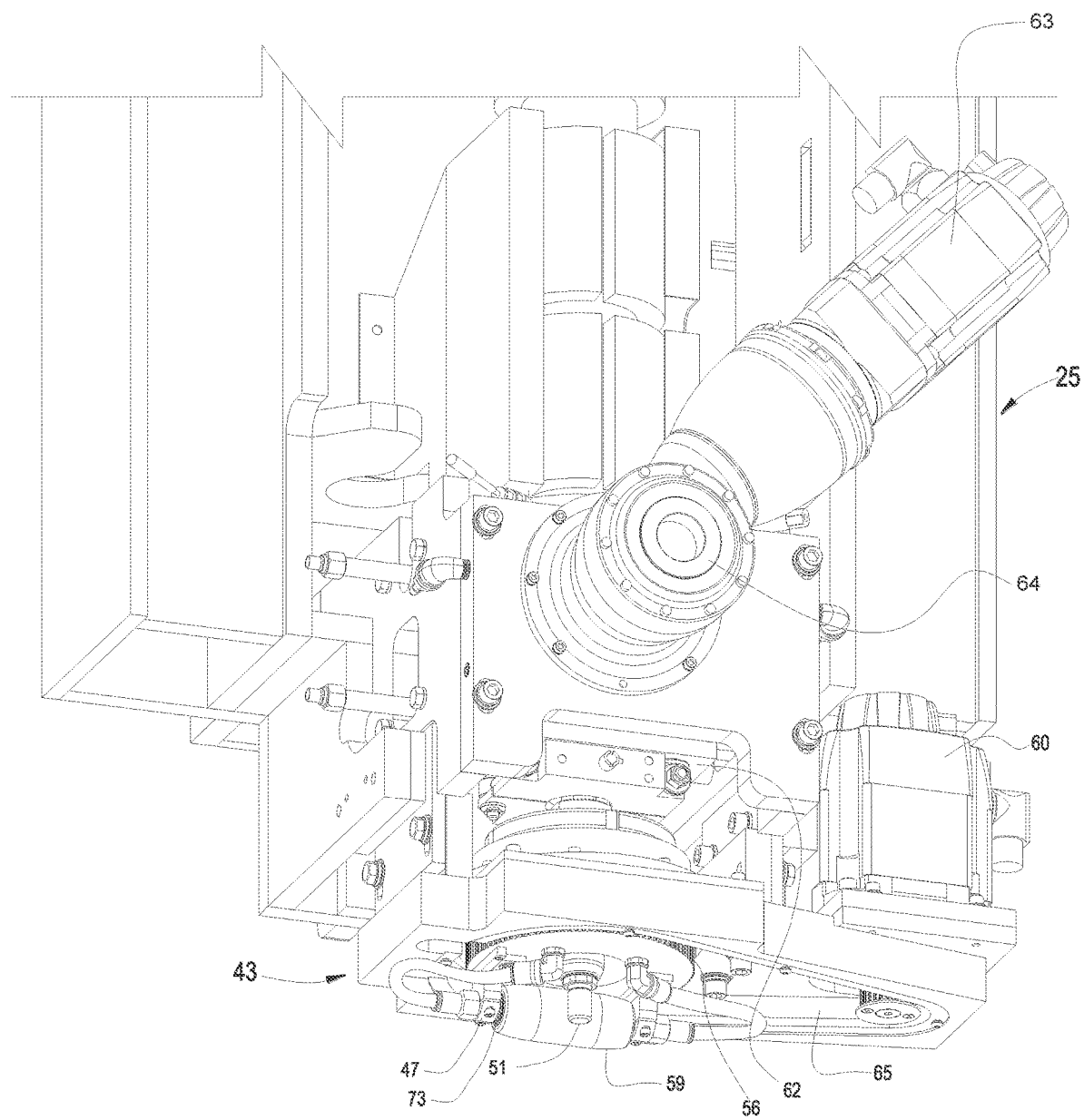
FIG. 3 is a perspective view of an exemplary carrier and applicator assembly of the exemplary CNC machine shown in FIG. 1.

As shown in FIG. 3, gear pump 62 may be securely mounted to the bottom of carrier 25. Gear pump 62 may be driven by a servomotor 63, through a gearbox 64. Gear pump 62 may receive molten plastic from extruder 61 (FIG. 2), and supply precisely metered thermoplastic material at predetermined flow rates to nozzle 51 to print the part. Applicator head 43 may be attached below gear pump 62 so as to be downstream of extruder 61 and gear pump 62 to receive thermoplastic material from extruder 61 and gear pump 62. A bead-shaping roller 59 may also be mounted below gear pump 62 on applicator head 43. Roller 59 may be rotationally mounted to a carrier bracket 47, so as to provide a mechanism for flattening and leveling a significantly oversized bead of fluid material (e.g., molten thermoplastic) extruded out the considerably sizeable nozzle 51. Carrier bracket 47 may be rotationally displaced by a servomotor 60, through a pulley or sprocket 56 connected to servomotor 60 by a belt or chain 65 arrangement. Pulley or sprocket 56 may be a plate-shaped rotating member that is configured to position sensor 49 and roller 59 at different angular positions and to rotate sensor 49 and roller 59 about nozzle 51.

Additive manufacturing apparatus 1 and controller 2 may utilize the above-described rotary mechanism or positioning assembly (e.g., servomotor 60, belt or chain 65, and sprocket 56) to modify the position of roller 59. In particular, controller 2 may be programmed with software to drive the system, including servomotor 60, to rotate compression roller 59 with respect to print nozzle 51. In particular, compression roller 59 may be rotated (e.g., in response to commands from controller 2) so that roller 59 is consistently positioned behind and perpendicular to the direction of motion of the print nozzle 51.

Figure 4:
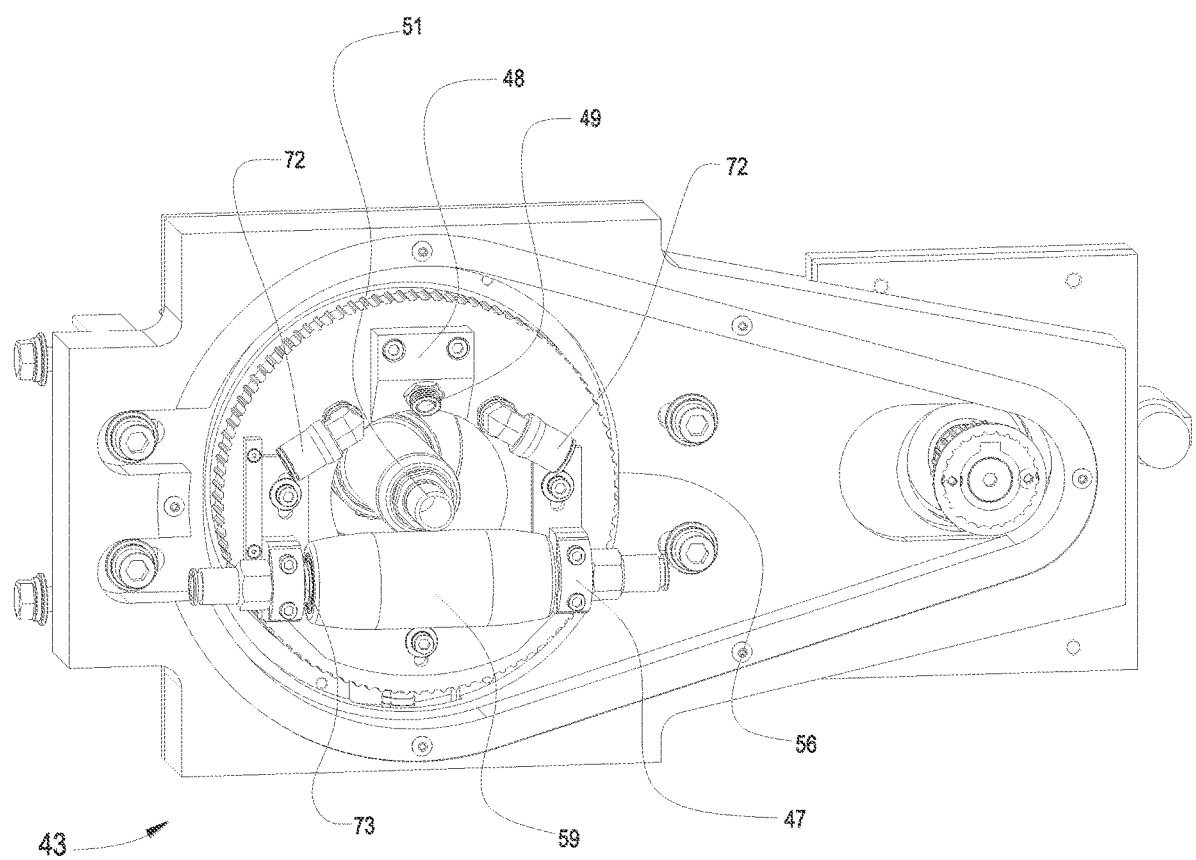
FIG. 4 is a perspective view of a bottom portion of an exemplary applicator assembly with an exemplary temperature sensor mounted within the applicator assembly.
Figure 5:
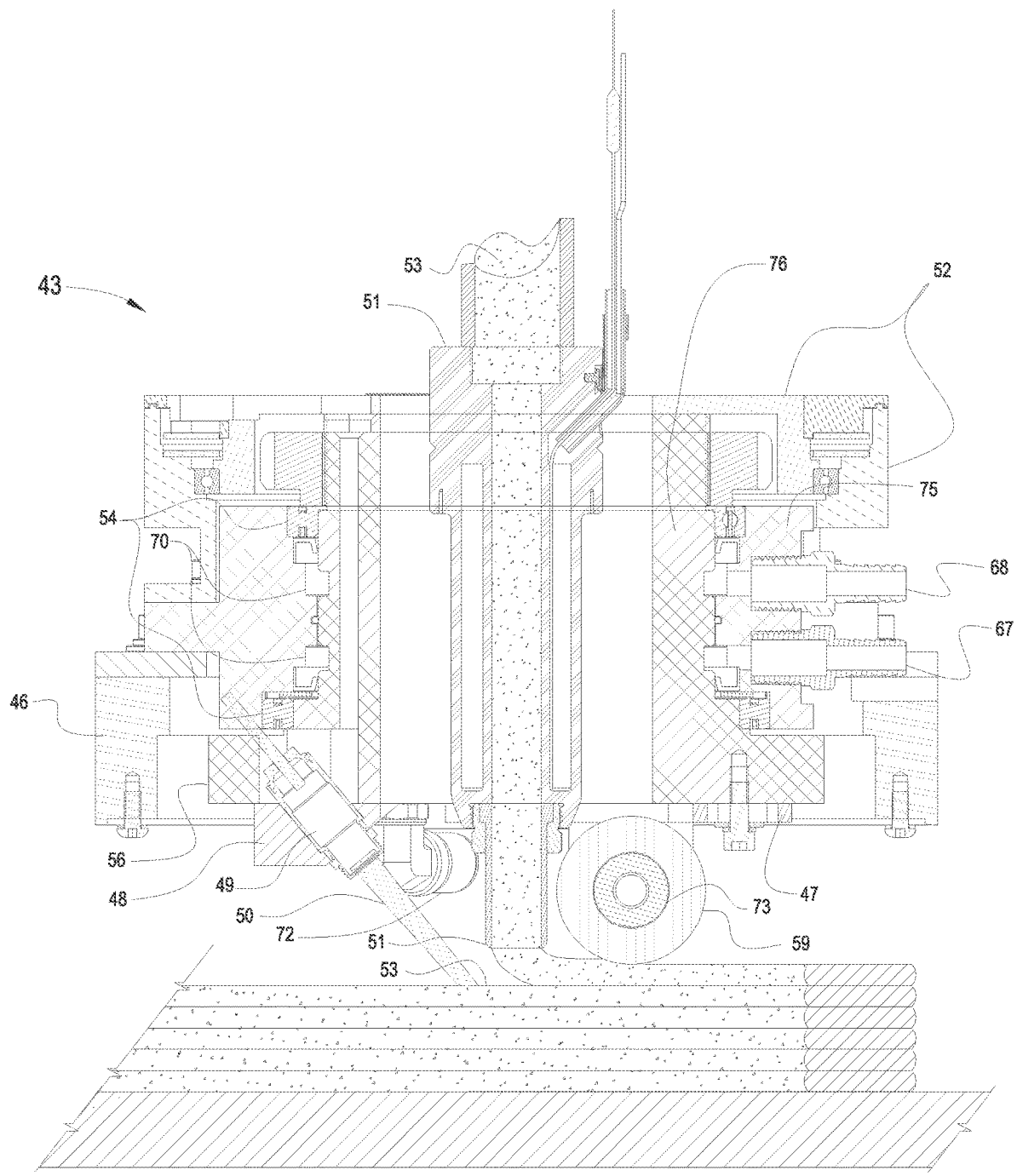
FIG. 5 is a cross-sectional view of the applicator head assembly shown in FIG. 4.

As shown in FIGS. 4 and 5, a temperature sensor 49 may be mounted to a bottom portion of applicator 43, such as a bottom surface of sprocket 56) for angular positioning by operation of the above-described positioning assembly (e.g., servomotor 60, belt or chain 65, sprocket 56), and in particular, by rotation of sprocket 56. Temperature sensor 49 may extend inside inner hub 76 and be secured within a block 48 protruding from a bottom surface of applicator head 43. This position may be in front of print nozzle 51, with respect to a direction nozzle 51 moves when depositing material. Block 48 may house temperature sensor 49 such that sensor 49 is directed to face a previously deposited print bead. In an exemplary configuration, sensor 49 may be angled (e.g., an angle of between about 15 degrees and about 60 degrees from a vertical direction) toward a previously printed print bead. If desired, sensor 49 may be directed downward so as to be approximately aligned with a vertical direction.

With reference to FIG. 5, applicator head 43 may include a housing 46 with a rotary union secured therein. The rotary union may contain coolant fittings 67 and 68 (e.g., barb fittings) in fluid communication with coolant passages 70 that surround inner hub 76 and an interior of outer housing 75 of the rotary union. Coolant passages 70 may extend through quick disconnect fittings 72 to supply coolant to an interior of an axle 73 of compression roller 59. Pulley or sprocket 56 may be machined into inner hub 76 of the rotary union. Inner hub 76 may have an opening with a diameter sized to allow the heated print nozzle 51 to pass through inner hub 76. Inner hub 76 may rotate on a set of bearings 54 contained in outer housing 75 of the rotary union. The compression roller assembly and temperature sensor 49 may both be attached to the inner hub 76 of the rotary union so that compression roller 59 and temperature sensor 49 both rotate about the print nozzle 51. For example, temperature sensor 49 and roller 59 may be positioned on opposite sides of nozzle 51. This positioning may configure temperature sensor 49 to read the temperature of the previously printed layer 53 at a point in time just before the next layer is added. In particular, temperature sensor 49 may detect the temperature of layer 53 with exemplary sensing beam 50 (e.g., laser light, infrared light). If desired, temperature sensor 49 may be configured as an optical system. The use of a temperature sensor 49 and/or controller 2 for controlling apparatus 1 based on the temperature of deposited material may reduce cost and complexity of the system, as described below.

In an exemplary configuration, temperature sensor 49 may be powered by a battery (e.g., a battery within temperature sensor 49 and/or positioned within applicator head 43). Additionally or alternatively, electrical power may be supplied to temperature sensor 49 by a power source external to temperature sensor 49 (e.g., controller 2 or an independent power source separate from apparatus 1 and controller 2). Information, which may be indicative of a temperature detected by temperature sensor 49, may be provided to an analysis system (e.g., controller 2) via wireless connection by a suitable standard, such as radiofrequency (e.g., RF, BLUETOOTH®, Wi-Fi, cellular, near-field communication, or others). In some aspects, it may be beneficial to provide temperature data in a continuous or nearly-continuous basis (e.g., as a data stream).

In an exemplary configuration, temperature sensor 49 may transmit data and/or receive power via a wired signal transmission mechanism. For example, applicator head 43 may include a rotary slip ring assembly 52, as shown in FIG. 5. Slip ring assembly 52 may receive signal and/or power cables extending from temperature sensor 49 to supply electrical power to the sensor and transmit temperature data to a suitable recording and processing device such as controller 2. Slip ring assembly 52 may allow unrestricted rotation of temperature sensor 49 by guiding cables from a rotating portion of applicator head, including sensor 49, to a non-rotating portion of applicator head 43 (e.g., outer housing 75 and a top surface of applicator head 43).

Figure 6:
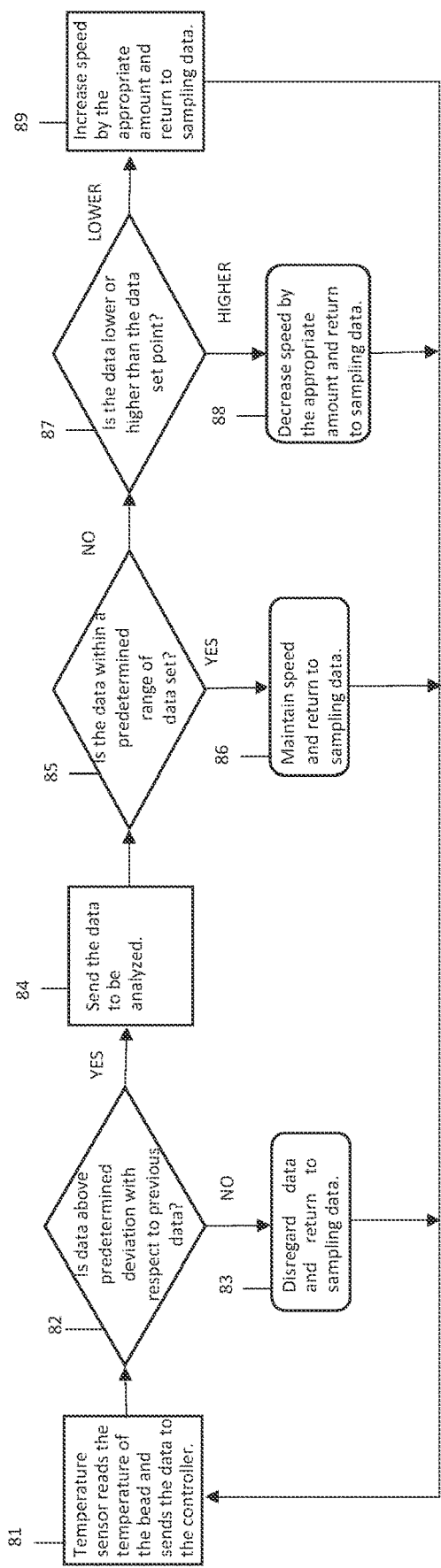
FIG. 6 is a flow chart of an exemplary method for using the additive manufacturing apparatus of FIG. 1.

FIG. 6 is a flowchart of an exemplary additive manufacturing method, according to aspects of the present disclosure. As shown in FIG. 6, in a step 81, temperature sensor 49 may detect the temperature of the previously deposited bead 53 upon which a new bead of material will be deposited by nozzle 51. However, when a sharp corner (e.g., when depositing material for a portion of a layer located at or near an edge of the part) is encountered, temperature sensor 49 may detect the temperature at a location outside of the deposited material. For example, temperature sensor 49 may detect the temperature of worktable 27, air adjacent to the part, etc. This temperature may be significantly lower than the temperature of the previously deposited bead of material. Temperature sensor 49 may generate a signal (e.g., data or information) indicative of the detected temperature. This signal may be received by a control system, such as controller 2, or an additional control system external to controller 2.

A step 82 may include determining whether the temperature detected in step 81 represents an actual temperature of the previously deposited part, or if the detected temperature is instead a temperature outside of the bead, layer, and/or part. This may include determining, with controller 2, whether the detected temperature is in a predetermined maximum range of the previous data. For example, controller 2 may determine whether the detected temperature is lower than a previously detected temperature by a predetermined temperature difference (e.g., 50, 40, 30, 20, or 10 degrees Celsius below a previously detected temperature) or more. Additionally or alternatively, step 82 may include comparing the detected temperature to a predetermined lowest expected temperature value associated with a bead of material (e.g., a coldest temperature expected to be encountered during printing, such as 37, 50, or 90 degrees Celsius) and determining whether the detected temperature is above the lowest expected temperature value. The above-described temperature difference and lowest expected temperature values are exemplary and can change, in some cases significantly, based on the type of material being deposited, as well as the amount of temperature variance that can occur without adversely affecting inter-layer bonding. These values may be predetermined and stored in controller 2, based on a material qualification process, and monitored by controller 2 during operation of apparatus 1. In at least some configurations, the predetermined temperature difference and/or the lowest expected temperature value may change over time. For example, controller 2 may be configured to set and/or change the predetermined temperature difference, the lowest expected temperature value, or both, based on the material being deposited, the ambient temperature, a desired deposition temperature, the melting point of the deposited material, etc. The predetermined temperature difference, lowest expected temperature value, or both, may be set by a user by interacting with controller 2 (e.g., by directly setting one or both of these values, by inputting a type of material supplied to apparatus 1, etc.).

When the determination in step 82 is negative, controller 2 may determine that the detected temperature is not representative of the temperature of the deposited material (e.g., the detected temperature exceeds the predetermined temperature difference, is below the lowest expected temperature value, or both). When this occurs, step 83 may include disregarding data received by the controller 2 in step 81. The method may then return to step 81 to resume the process of sampling temperature data.

When the determination in step 82 is affirmative, the detected temperature may be indicative of the actual temperature of the previously deposited bead of material. This may occur, for example, when nozzle 51 follows a path that does not include a sharp turn, as well as when nozzle 51 begins moving in a new direction following a sharp turn after the rotary mechanism has realigned compression roller 59 and temperature sensor 49 with the new direction of the bead 53. Step 84 may include analyzing the temperature data to determine whether a speed at which apparatus 1 operates should be adjusted (e.g., by increasing or decreasing a speed at of motion of nozzle 51).

A step 85 may include determining whether the temperature data is within a predetermined minimum range of a data set (e.g., one or more previously detected temperatures). Step 85 may include determining whether the detected temperature is below one or more previously detected temperatures and deviates from the previously detected temperature(s) by a predetermined amount or more. When the determination in step 85 is affirmative (the detected temperature deviates from one or more previous temperatures by an acceptable amount) additive manufacturing apparatus 1 may maintain speed constant or approximately constant. The method may then return to step 86.

When the determination in step 85 is negative (the detected temperature deviates from one or more previously detected temperatures by an unacceptable amount), the method may proceed to step 87. Step 87 may include determining whether the detected temperature in the data received from temperature sensor 49 is lower or higher than a predetermined set point. This set point (e.g., a temperature data set point) may be a predetermined desired temperature, or range of temperatures, of the previously deposited bead. The predetermined set point may be based on the material being deposited, a characteristic of the material being deposited (e.g., a melting point). In some aspects, the predetermined set point may be input by a user.

When the detected temperature is above the temperature data set point (e.g., above a maximum set point temperature), a step 88 may be performed. In step 88, controller 2 may decrease a speed of additive manufacturing apparatus 1 (e.g., one or more of: a movement speed of nozzle 51 and applicator head 43, a speed of operation of extruder 61, and a speed of operation of gear pump 62) by an appropriate amount. In some aspects, the amount the speed is decreased may be based on the difference between the detected temperature and the set point, such that the reduction in speed is larger as this difference increases. The method may then return to step 81 to continue sampling temperature data.

When the detected temperature is below the predetermined step point (e.g., below a minimum set point temperature), a step 89 may be performed. In step 89, controller 2 may increase the speed of additive manufacturing apparatus 1 by an appropriate amount and return to sampling data in step 89. In some aspects, the amount the speed is increased may be based on the difference between the detected temperature and the set point, such that the increase in speed is larger as this difference increases.

In some aspects, the difference between the temperature of air and that of the previously printed beads may be large, allowing step 82 to be reliably performed by appropriate software to discard temperature data when temperature sensor 49 is not aligned with the previously printed bead. Additionally, controller 2 may be provided with suitable programming (e.g., software) to reliably control the speed of the additive manufacturing apparatus 1, so the new layer is print upon the previous layer at an appropriate time and temperature.

It may also be possible, utilizing appropriate software, to analyze geometry of the bead associated with the detected temperature, and the rotational position of the assembly associated with temperature sensor 49, to identify each location where the temperature sensor 49 would not be directed towards the previously printed bead (e.g., by analyzing a path of applicator head 43 to identify sharp turns. This additional analysis, which may be performed instead of or in addition to step 82 of the above-described method, may provide an accurate temperature reading while reliably discarding data points that are not indicative of the actual temperature of the deposited material. When geometry analysis of a part is performed as step 82 or as a portion of step 82, the remainder of the method may be performed as described above.

The systems and methods described herein may, in at least some embodiments, provide the ability to accurately detect and identify the temperature of the previously printed bead immediately before a new bead of material is printed on top of the previously deposited bead. At least some aspects may provide a continuous data stream that accurately reflects the temperature of an entirety of each layer that is printed or an entirety of a portion of each printed layer.

In at least some embodiments, a data stream or other form of temperature measurement, as described herein, can be used to improve the quality of the print process. For example, an instantaneous and/or average temperature of each layer can be determined accurately, while discarding information that is not indicative of the actual temperature of deposited material, so that the timing of the print layer can be adjusted automatically. This may result in a print layer that is closer to the ideal temperature when receiving a new bead, as compared to existing methods. Additionally or alternatively, use of predicative algorithms with temperature data (e.g., an ongoing data stream) may adjust print speed within a layer, as described above with respect to FIG. 6. This capability may be beneficial, for example, for researchers using additive manufacturing apparatus 1, and may improve the print process. As another example, print temperature data as described herein could also provide the basis for a quality assurance procedure to verify the integrity of a manufactured part, such as a part intended for use in a critical application. By measuring the print temperature at every point in every layer of a part, it may be possible to have a high level of certainty that no layer to layer bonding faults exist in the part.

From the foregoing detailed description, it will be evident that there are a number of changes, adaptations and modifications of the present disclosure which come within the province of those persons having ordinary skill in the art to which the disclosure pertains. However, it is intended that all such variations not departing from the spirit of the disclosure be considered as within the scope thereof as limited by the appended claims.

What is claimed is:

1. An additive manufacturing apparatus, comprising:
an extruder configured to receive a thermoplastic material;
an applicator assembly downstream of the extruder, the applicator assembly including:
an outer housing;
an inner hub surrounded by the outer housing, the inner hub being rotatable with respect to the outer housing;
a nozzle for depositing the thermoplastic material as a plurality of layers;
a temperature sensor configured to detect a temperature of at least a portion of a deposited layer, the temperature sensor being secured to the inner hub;
a positioning assembly configured to change an angular position of the temperature sensor; and
a controller configured to:
receive temperature signals from the temperature sensor, including a first temperature signal representative of a first temperature and a second temperature signal representative of a second temperature that is different from the first temperature,
compare the first temperature to a first previously detected temperature,
compare the second temperature to a second previously detected temperature, change a movement speed of the applicator assembly when the first temperature is lower than the first previously detected temperature by a first temperature difference, and
ignore the second temperature signal when the second temperature is lower than the second previously detected temperature by a second temperature difference that is greater than the first temperature difference.

2. The additive manufacturing apparatus of claim 1, wherein the positioning assembly is configured to rotate the temperature sensor about the nozzle.

3. The additive manufacturing apparatus of claim 1, wherein the temperature sensor is secured to a bottom surface of the applicator assembly.

4. The additive manufacturing apparatus of claim 1, wherein the temperature sensor is angled toward a position adjacent to the nozzle.

5. The additive manufacturing apparatus of claim 1, wherein the nozzle is positioned between the temperature sensor and a compression device.

6. The additive manufacturing apparatus of claim 5, wherein the compression device includes a compression roller.

7. The additive manufacturing apparatus of claim 5, wherein the positioning assembly includes a rotating member and a servomotor configured to cause the rotating member to rotate and position the compression device and the temperature sensor.

8. The additive manufacturing apparatus of claim 1, wherein the temperature sensor is secured to a sprocket of the applicator assembly.

9. The additive manufacturing apparatus of claim 1, wherein the applicator assembly further includes a slip ring assembly.

10. The additive manufacturing apparatus of claim 9, wherein the slip ring assembly guides one or more signal or power cables to the temperature sensor such that the signal or power cables extend within the applicator assembly.

11. An additive manufacturing system, comprising:
an additive manufacturing apparatus, including:
an extruder configured to receive material;
an applicator assembly downstream of the extruder; and
a temperature sensor configured to generate a temperature signal indicative of a temperature of at least a portion of a first layer deposited while moving the applicator assembly; and
a controller configured to:
receive temperature signals from the temperature sensor, including a first temperature signal representative of a first temperature and a second temperature signal representative of a second temperature different from the first temperature, compare the first temperature to a first previously detected temperature, compare the second temperature to a second previously detected temperature, change a movement speed of the applicator assembly when the first temperature is lower than the first predetermined temperature by a first temperature difference, and ignore the second temperature signal when the second temperature is lower than the second predetermined temperature by a second temperature difference that is greater than the first temperature difference.

12. The additive manufacturing system of claim 11, wherein the controller is further configured to determine that the temperature signal is not indicative of an actual temperature of at least the portion of the first layer.

13. The additive manufacturing system of claim 11, wherein the controller is further configured to increase a movement speed of the applicator assembly when depositing at least a portion of a second layer when the temperature signal is indicative of a temperature that is below a desired temperature.

14. The additive manufacturing system of claim 11, further including a positioning assembly configured to change a position of the temperature sensor as compared to other components of the applicator assembly.

15. The additive manufacturing system of claim 11, wherein the temperature sensor faces a position ahead of a nozzle of the applicator assembly.

16. The additive manufacturing system of claim 11, wherein the first temperature and the second temperature are compared to a predetermined temperature set point to determine whether to change the movement speed of the applicator assembly.

17. The additive manufacturing system of claim 16, wherein the predetermined temperature threshold is set based on the material being deposited.

18. The additive manufacturing system of claim 17, wherein the predetermined temperature threshold is changed based on a type of material supplied to the extruder.

* * * * *